(12) United States Patent
Fang et al.

(10) Patent No.: US 8,985,643 B2
(45) Date of Patent: Mar. 24, 2015

(54) POSITION-LIMITING MECHANISM

(75) Inventors: Peir-Yun Fang, Taipei (TW);
Cheng-Chao Peng, Taipei (TW)

(73) Assignee: Compal Electronics, Inc., Taipei (TW)

( * ) Notice: Subject to any disclaimer, the term of this patent is extended or adjusted under 35 U.S.C. 154(b) by 929 days.

(21) Appl. No.: 13/163,749

(22) Filed: Jun. 20, 2011

(65) Prior Publication Data
US 2012/0228885 A1     Sep. 13, 2012

(30) Foreign Application Priority Data
Mar. 7, 2011    (TW) .............................. 100107555 A (51) Int. Cl.
*E05C 1/06*         (2006.01)
*G06F 1/16*         (2006.01)
*H04M 1/02*         (2006.01)

(52) U.S. Cl.
CPC ........... *G06F 1/1635* (2013.01); *H04M 1/0262* (2013.01); *Y10S 292/11* (2013.01); *Y10S 292/63* (2013.01)
USPC .... 292/138; 292/145; 292/163; 292/DIG. 11; 292/DIG. 63

(58) Field of Classification Search
USPC .......... 292/137, 138, 163, 175, 145, DIG. 11, 292/DIG. 53, DIG. 64, DIG. 63
See application file for complete search history.

(56) References Cited

U.S. PATENT DOCUMENTS 1,023,391 A * 4/1912 Parsons ........................... 292/33
4,740,020 A * 4/1988 Williams ......................... 292/41

FOREIGN PATENT DOCUMENTS

TW        201108700      3/2011
TW        M399580        3/2011

OTHER PUBLICATIONS

"Office Action of Taiwan Counterpart Application", issued on Dec. 26, 2013, p. 1-p. 6.

* cited by examiner

*Primary Examiner* — Kristina Fulton
*Assistant Examiner* — Christine M Mills
(74) *Attorney, Agent, or Firm* — Jianq Chyun IP Office (57) ABSTRACT

A position-limiting mechanism includes a first position-limiting element, a second position-limiting element, and a knob. The first and second position-limiting elements and the knob are slidably configured on a main body. A first component and a second component are secured to the main body by the first and second position-limiting elements, respectively. The knob is movably connected to the first and second position-limiting elements. When the knob slides relatively to the main body along a first direction, the knob drives the first position-limiting element to release the first component. When the knob slides relatively to the main body along a second direction, the knob drives the second position-limiting element to release the second component.

9 Claims, 8 Drawing Sheets

POSITION-LIMITING MECHANISM

CROSS-REFERENCE TO RELATED APPLICATION

This application claims the priority benefit of Taiwan application serial no. 100107555, filed on Mar. 7, 2011. The entirety of the above-mentioned patent application is hereby incorporated by reference herein and made a part of this specification.

BACKGROUND OF THE INVENTION

1. Field of the Invention

The invention relates to a position-limiting mechanism. More particularly, the invention relates to a position-limiting mechanism of a portable electronic device.

2. Description of Related Art

Advancement of semiconductor devices and display technology leads to continuous development of electronic devices towards compactness, capabilities for performing multiple functions, and portability. Common electronic devices include personal digital assistants (PDAs), mobile phones, notebook computers, and so forth. In order to achieve the objective of compactness, most portable electronic devices are designed to be foldable to save the storage space.

A notebook computer, for instance, is equipped with a battery for supplying power to the system during operation, so as to allow a user to carry and use the notebook computer everywhere. In most cases, the battery is configured at the rear end of the bottom of the notebook computer. In addition, a detachable bottom cover can be configured at the bottom of the notebook computer for the convenience of replacing, maintaining, or cleaning components in the notebook computer. A knob is often configured at the bottom of the notebook computer, and the user can push the knob to drive the mechanism to fasten or release the battery. Given the knob not only can fasten or release the battery but also can fasten or release the bottom cover, the design of the mechanism at the bottom of the notebook computer can be simplified, and assembly and disassembly of the battery and the bottom cover can be expedited.

SUMMARY OF THE INVENTION

The invention relates to a position-limiting mechanism in which a first component and a second component can be fastened or released by a single knob.

In an embodiment of the invention, a position-limiting mechanism that includes a first position-limiting element, a second position-limiting element, and a knob is provided. The first position-limiting element is slidably configured on the main body and secures the first component to the main body. The second position-limiting element is slidably configured on the main body and secures the second component to the main body. The knob is slidably configured on the main body and movably connected to the first and second position-limiting elements. When the knob slides relatively to the main body along a first direction, the knob drives the first position-limiting element to release the first component. When the knob slides relatively to the main body along a second direction, the knob drives the second position-limiting element to release the second component.

According to an embodiment of the invention, the position-limiting mechanism further includes an elastic element. The elastic element is connected between the first position-limiting element and the main body. When the knob slides along the first direction and drives the first position-limiting element to release the first component, the elastic element stores an elastic potential. The elastic element is suitable for releasing the elastic potential to draw back the knob and the first position-limiting element along the second direction.

According to an embodiment of the invention, the knob has a first sliding slot and a second sliding slot. The first position-limiting element and the second position-limiting element respectively have a first protrusion and a second protrusion. The first protrusion is inserted into the first sliding slot. The second protrusion is inserted into the second sliding slot. When the knob slides relatively to the main body along the first direction, the knob pushes the first protrusion to drive the first position-limiting element to release the first component, and the second sliding slot allows the knob to move relatively to the second protrusion along the first direction. When the knob slides relatively to the main body along the second direction, the knob pushes the second protrusion to drive the second position-limiting element to release the second component, and the first sliding slot allows the knob to move relatively to the first protrusion along the second direction.

According to an embodiment of the invention, an extension direction of the first sliding slot and an extension direction of the second sliding slot are parallel to the first direction and the second direction.

According to an embodiment of the invention, the knob is suitable for pushing the first protrusion via an end of the first sliding slot and pushing the second protrusion via an end of the second sliding slot. When the first position-limiting element secures the first component to the main body, and the second position-limiting element limits the second component to the main body, the first protrusion leans against the end of the first sliding slot, and the second protrusion leans against the end of the second sliding slot.

According to an embodiment of the invention, the knob has a pushing portion exposed on the main body.

According to an embodiment of the invention, the first component and the second component are individual components and are not in direct contact with each other.

According to an embodiment of the invention, the first position-limiting element and the second position-limiting element are configured in parallel.

According to an embodiment of the invention, the first direction and the second direction are opposite to each other.

According to an embodiment of the invention, the first component and the second component are a battery and a bottom cover.

Based on the above, the knob described in the embodiments of the invention is movably connected to the first position-limiting element and the second position-limiting element. Thereby, a user can push the knob along the first direction to drive the first position-limiting element without driving the second position-limiting element, so as to release the first component. In addition, the user can push the knob along the second direction to drive the second position-limiting element without driving the first position-limiting element, so as to release the second component. As such, the first and second components can be fastened or released by a single knob.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
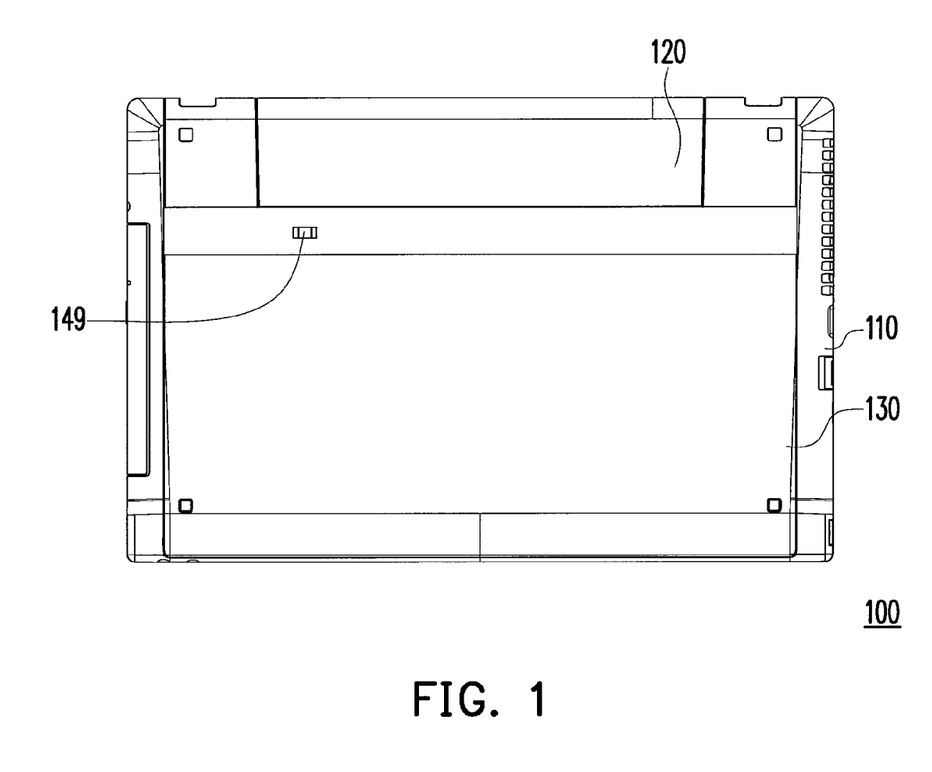
FIG. 1 is a bottom view illustrating a portable electronic device according to an embodiment of the invention.
Figure 2:
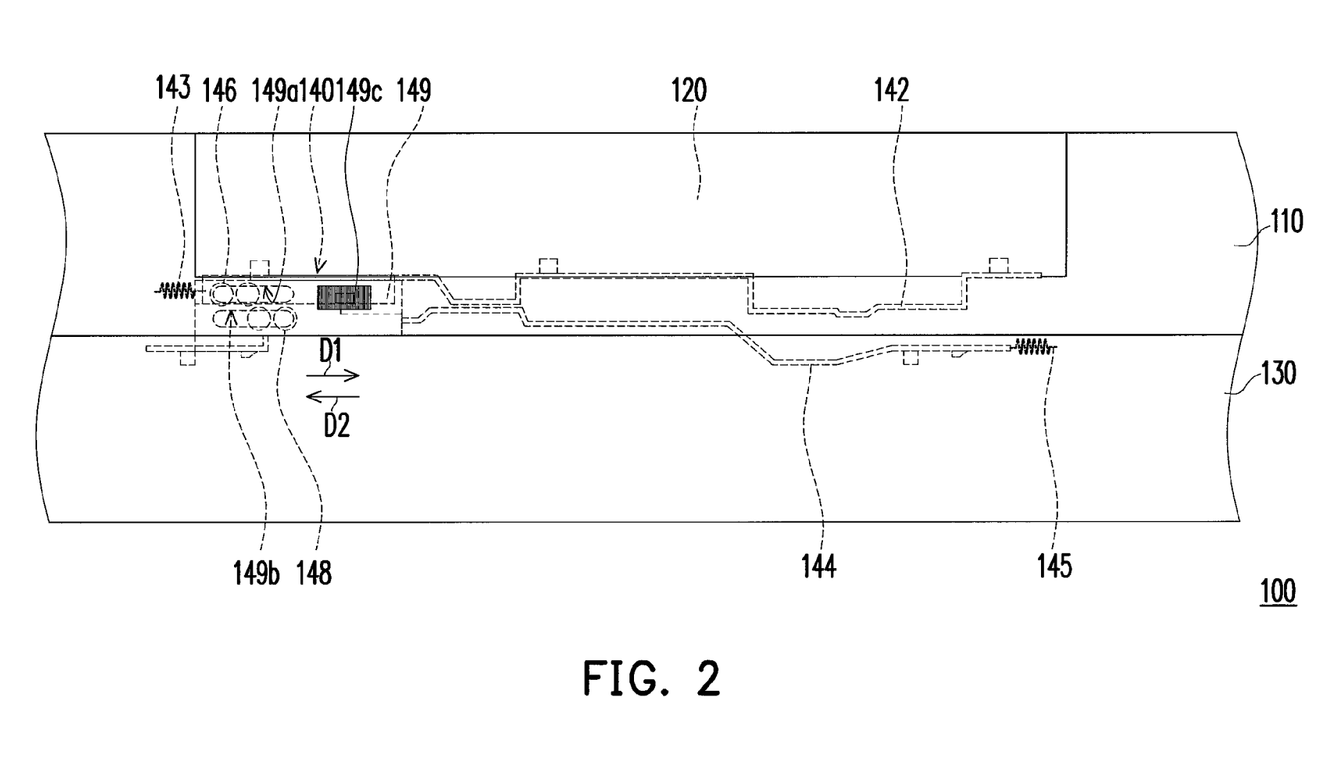
FIG. 2 is a perspective view partially illustrating the portable electronic device depicted in FIG. 1.
Figure 3:
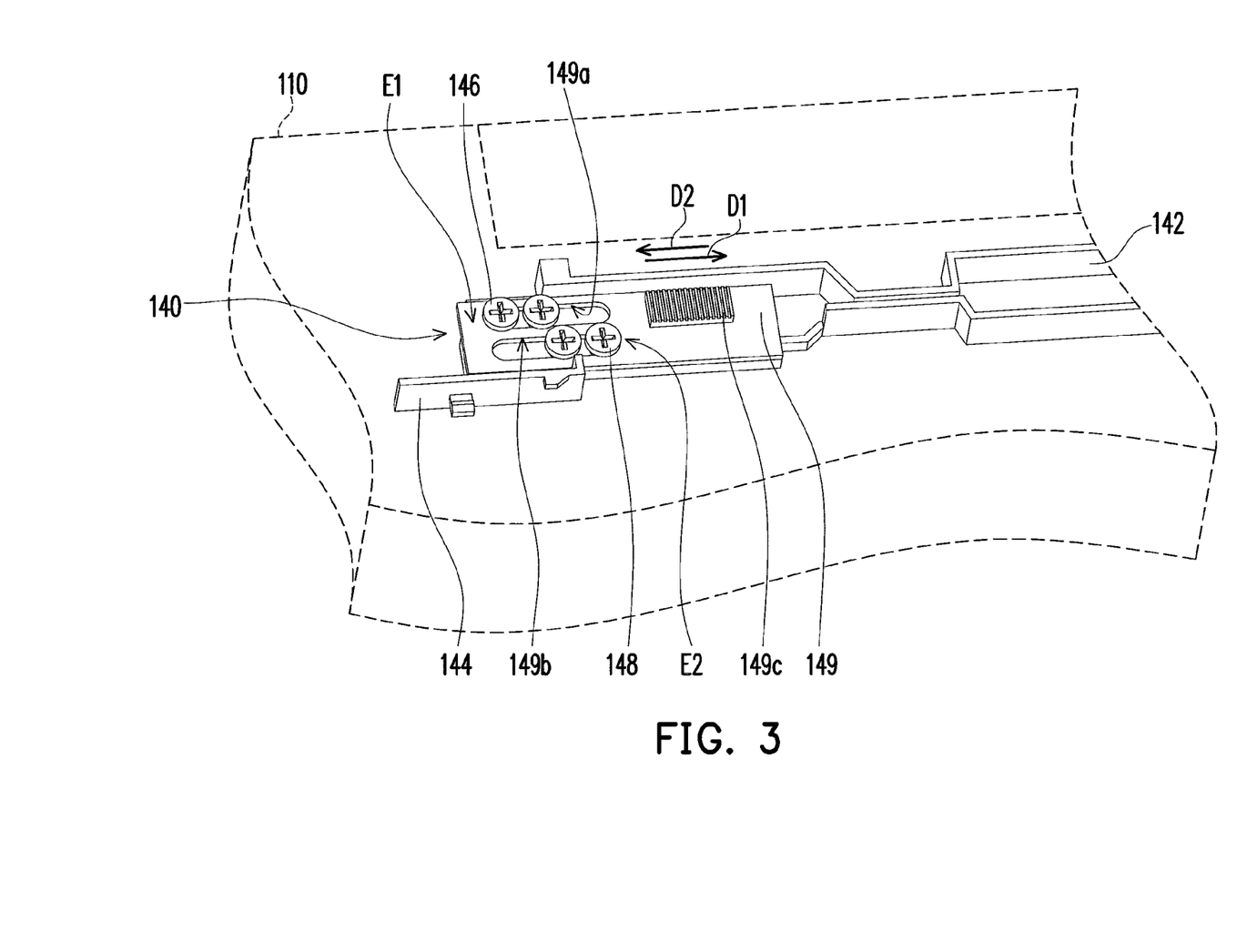
FIG. 3 is a three-dimensional view partially illustrating the portable electronic device depicted in FIG. 1.
Figure 4:
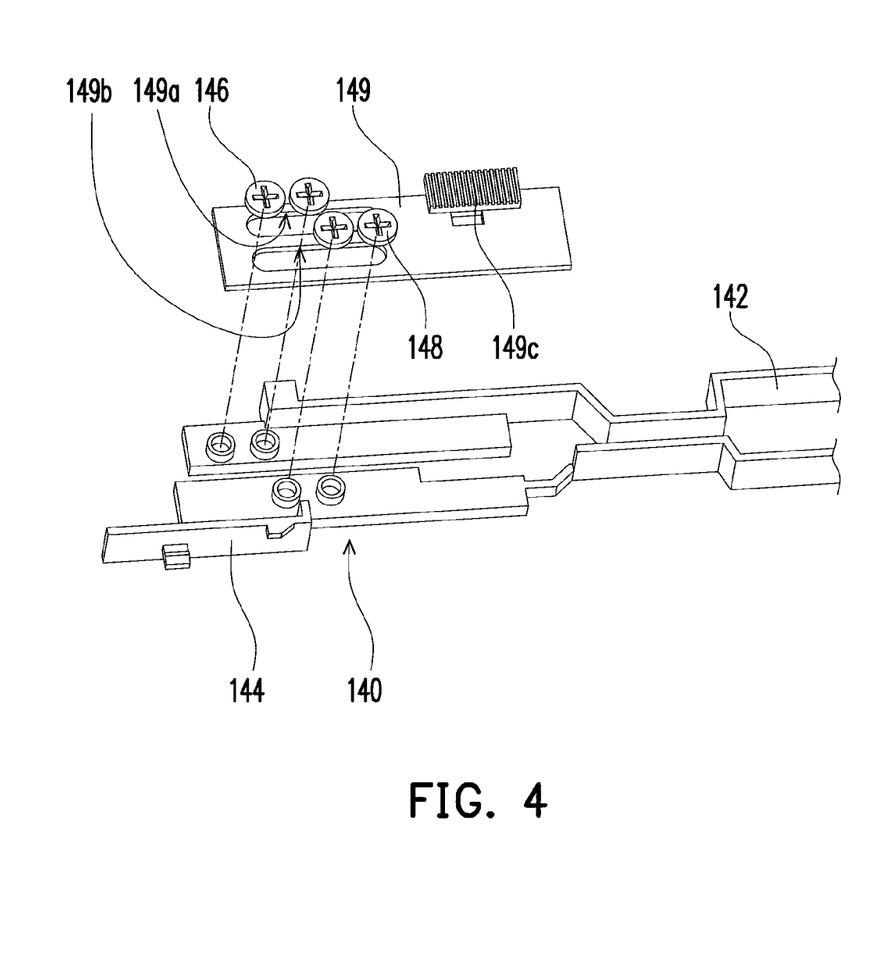
FIG. 4 is an explosive view illustrating some components of the position-limiting mechanism depicted in FIG. 2.

FIG. 1 is a bottom view illustrating a portable electronic device according to an embodiment of the invention. FIG. 2 is a perspective view partially illustrating the portable electronic device depicted in FIG. 1. FIG. 3 is a three-dimensional view partially illustrating the portable electronic device depicted in FIG. 1. FIG. 4 is an explosive view illustrating some components of the position-limiting mechanism depicted in FIG. 2. With reference to FIG. 1 to FIG. 4, the portable electronic device 100 of this embodiment includes a main body 110, a first component 120, a second component 130, and a position-limiting mechanism 140. The first component 120 and the second component 130 are configured on the main body 110. The position-limiting mechanism 140 includes a first position-limiting element 142, a second position-limiting element 144, a first protrusion 146, a second protrusion 148, and a knob 149. The first position-limiting element 142 is slidably configured on the main body 110 for securing the first component 120, and limits the position of the first component 120 on the main body 110. The second position-limiting element 144 is slidably configured on the main body 110 for securing the second component 130, and limits the position of the second component 130 on the main body 110.

The first protrusion 146 is fixed to the first position-limiting element 142, and the second protrusion 148 is fixed to the second position-limiting element 144. The knob 149 is slidably configured on the main body 110 and has a first sliding slot 149a and a second sliding slot 149b. The first protrusion 146 is inserted into the first sliding slot 149a, and the second protrusion 148 is inserted into the second sliding slot 149b, such that the knob 149 is movably connected between the first position-limiting element 142 and the second position-limiting element 144. The portable electronic device 100 of this embodiment is a notebook computer, for instance. The first component 120 and the second component 130 are respectively a battery and a bottom cover, for instance. The first component 120 and the second component 130 are individual components and are not in direct contact with each other.

Figure 5A:
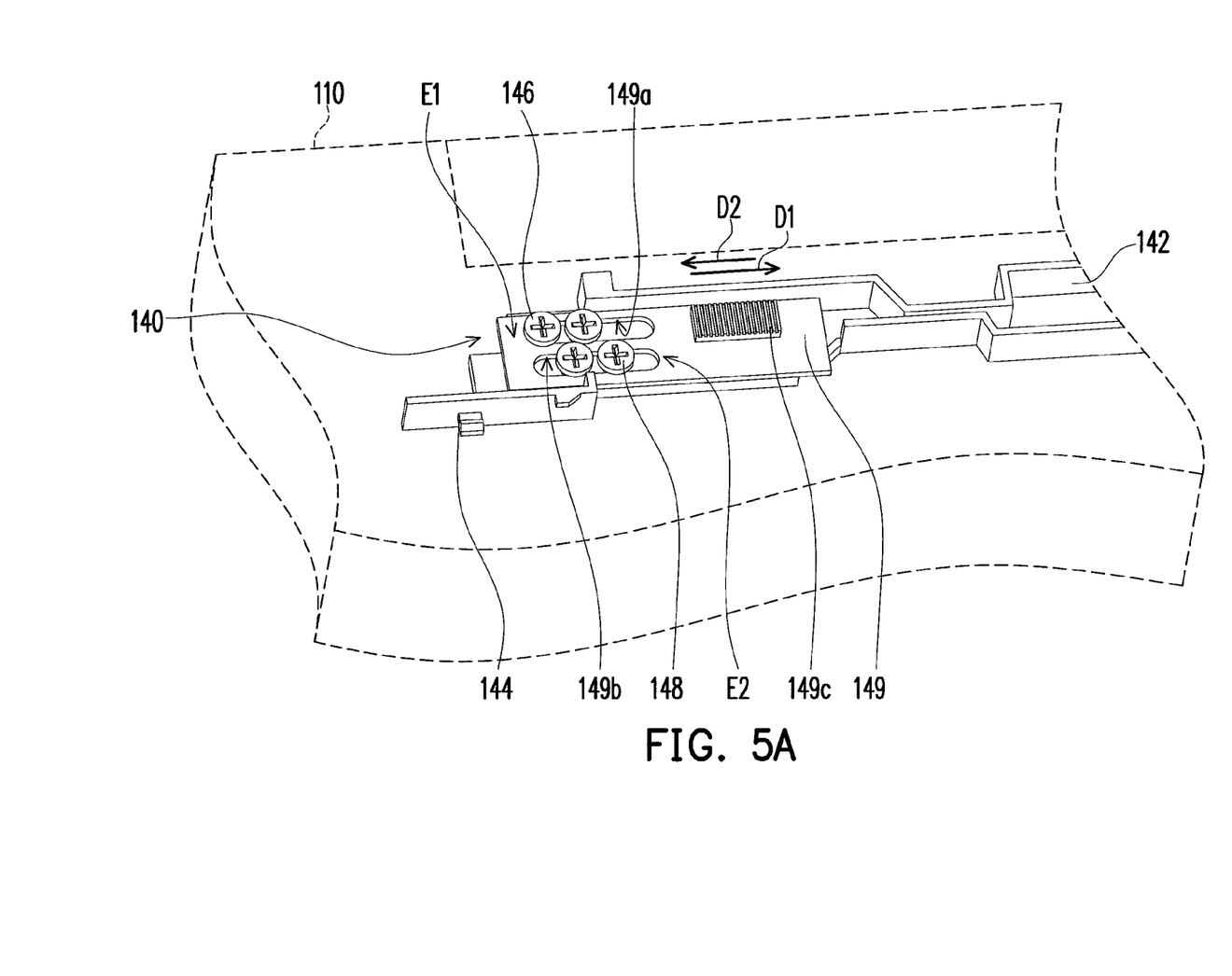
FIG. 5A and FIG. 5B are schematic operational views illustrating the position-limiting mechanism depicted in FIG. 3.
Figure 5B:
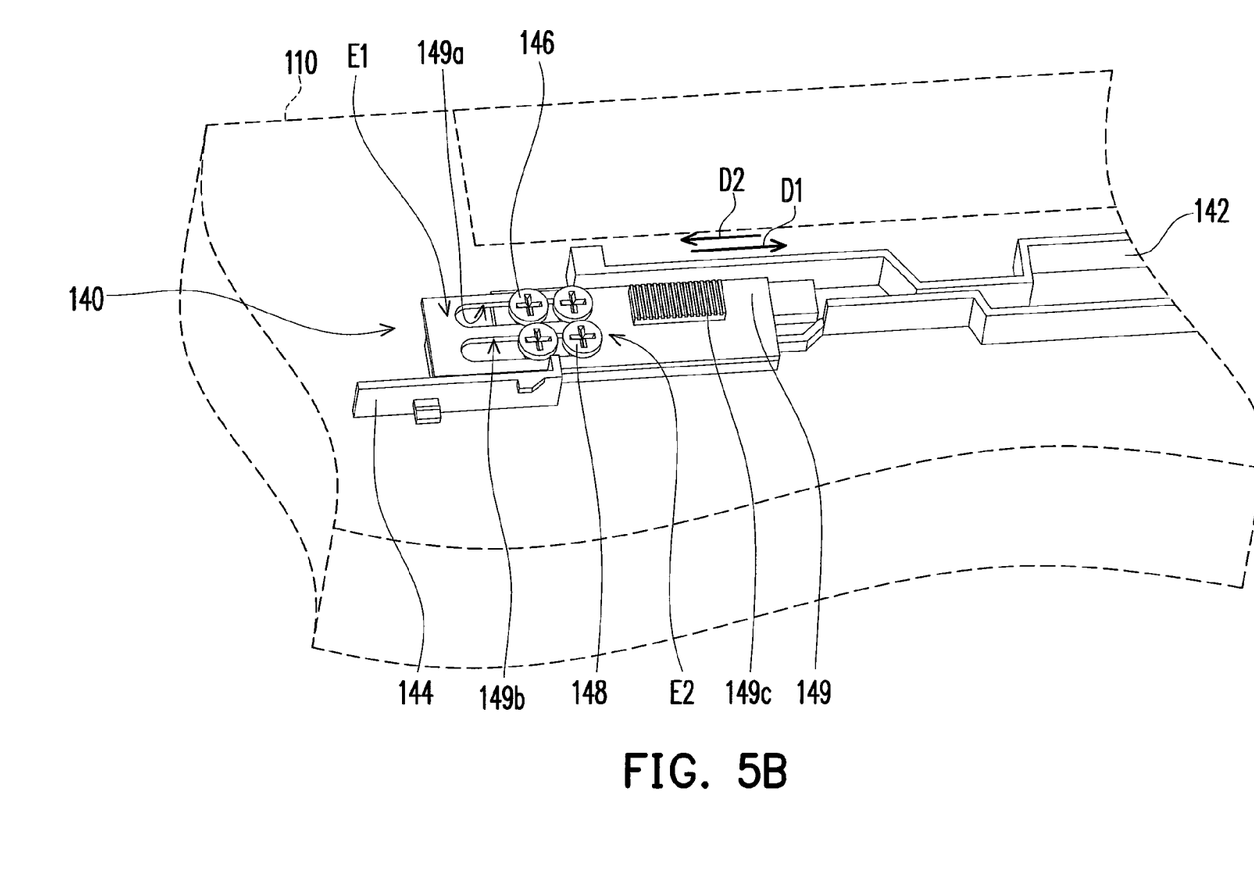

FIG. 5A and FIG. 5B are schematic operational views illustrating the position-limiting mechanism depicted in FIG. 3. When the knob 149 slides relatively to the main body 110 along a first direction D1 from the position shown in FIG. 3 to the position shown in FIG. 5A, the knob 149 pushes the first protrusion 146 to drive the first position-limiting element 142 to release the first component 120, and the second sliding slot 149b provides a space which allows the knob 149 to move relatively to the second protrusion 148 along the first direction D1. When the knob 149 slides relatively to the main body 110 along a second direction D2 opposite to the first direction D1 from the position shown in FIG. 3 to the position shown in FIG. 5B, the knob 149 pushes the second protrusion 148 to drive the second position-limiting element 144 to release the second component 130, and the first sliding slot 149a provides a space which allows the knob 149 to move relatively to the first protrusion 146 along the second direction D2.

Thereby, a user can push the knob 149 along the first direction D1 to drive the first position-limiting element 142 without driving the second position-limiting element 144, so as to release the first component 120. In addition, the user can push the knob 149 along the second direction D2 to drive the second position-limiting element 144 without driving the first position-limiting element 142, so as to release the second component 130. As such, the first and second components 120 and 130 can be fastened or released by a single knob 149.

Figure 6:
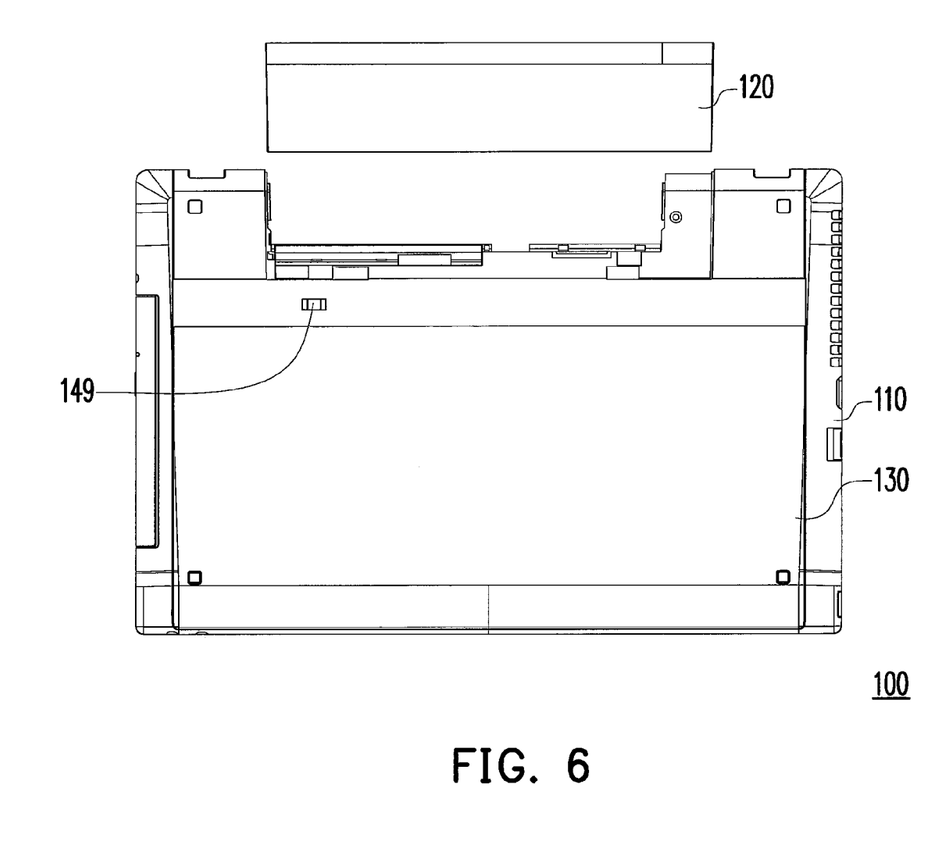
FIG. 6 is a schematic view illustrating that the first component depicted in FIG. 1 is separated from the main body.
Figure 7:
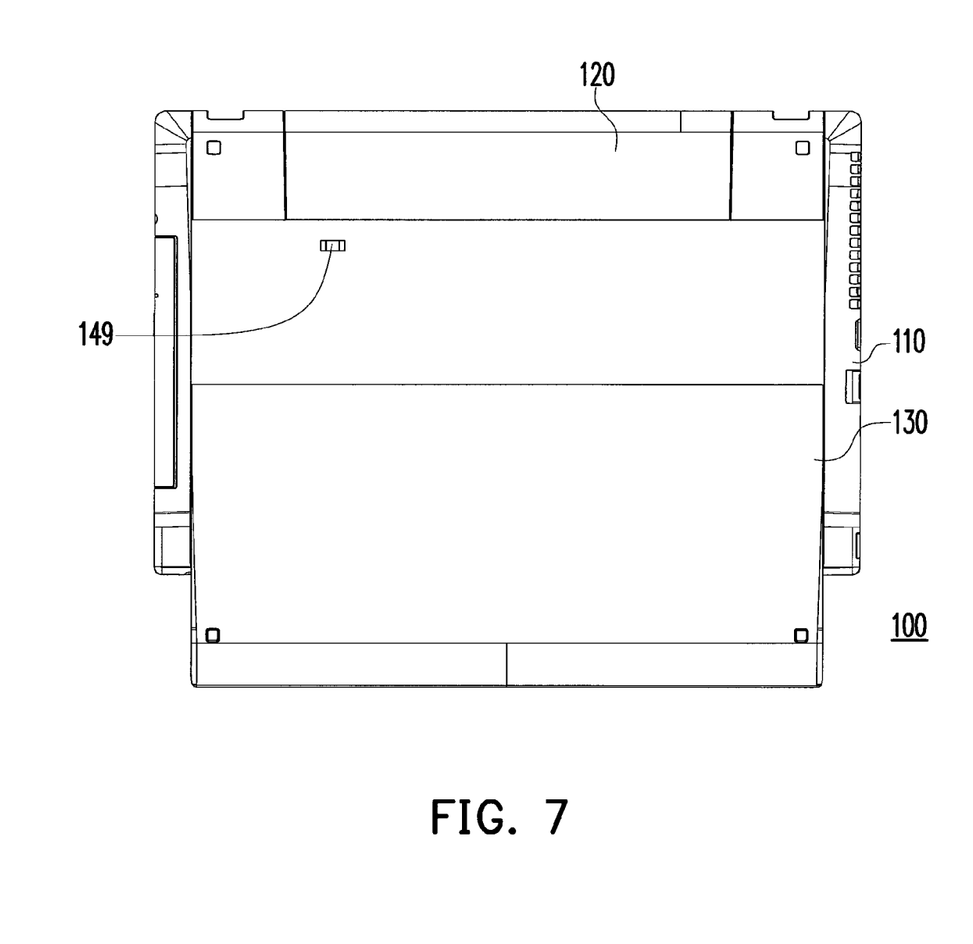
FIG. 7 is a schematic view illustrating that the second component depicted in FIG. 1 is separated from the main body.

FIG. 6 is a schematic view illustrating that the first component depicted in FIG. 1 is separated from the main body. FIG. 7 is a schematic view illustrating that the second component depicted in FIG. 1 is separated from the main body. After the user pushed the knob 149 to the position shown in FIG. 5A to drive the first position-limiting element 142 to release the first component 120, the first component 120 is separated from the main body 110, as indicated in FIG. 6. In addition, after the user pushed the knob 149 to the position shown in FIG. 5B to drive the second position-limiting element 144 to release the second component 130, the second component 130 is separated from the main body 110, as indicated in FIG. 7.

With reference to FIG. 2, in this embodiment, the position-limiting mechanism 140 further includes an elastic element 143. The elastic element 143 is an extension spring, for instance, and the elastic element 143 is connected between the first position-limiting element 142 and the main body 110. When the user pushes the knob 149 along the first direction D1 to move from the position shown in FIG. 2 to the position shown in FIG. 4A and the first position-limiting element 142 is driven to release the first component 120, the elastic element 143 is extended and stores the elastic potential. When the user stops pushing the knob 149, the elastic element 143 releases the elastic potential to draw the knob 149 and the first position-limiting element 142 back to the position shown in FIG. 2 along the second direction D2.

In this embodiment, the position-limiting mechanism 140 further includes an elastic element 145. The elastic element 145 is an extension spring, for instance, and the elastic element 145 is connected between the second position-limiting element 144 and the main body 110. When the user pushes the knob 149 along the second direction D2 to move from the position shown in FIG. 2 to the position shown in FIG. 5B and the second position-limiting element 144 is driven to release the second component 130, the elastic element 143 is extended and stores the elastic potential. When the user stops pushing the knob 149, the elastic element 145 releases the elastic potential to draw the knob 149 and the second position-limiting element 144 back to the position shown in FIG. 3 along the first direction D1.

With reference to FIG. 3, FIG. 5A, and FIG. 5B, to be more specific, both an extension direction of the first sliding slot 149a and an extension direction of the second sliding slot 149b are parallel to the first direction D1 and the second direction D2 according to this embodiment. The first position-limiting element 142 and the second position-limiting element 144 are configured in parallel, and the moving directions of the first and second position-limiting elements 142 and 144 are the same as the first and second directions D1 and D2, respectively. In addition, the knob 149 is suitable for pushing the first protrusion 146 via an end E1 of the first sliding slot 149a and pushing the second protrusion 148 via an end E2 of the second sliding slot 149b. When the first position-limiting element 142 and the second position-limiting element 144 are located at the position shown in FIG. 3 and respectively secures the first component 120 (shown in FIG. 1 and FIG. 2) and the second component 130 (shown in FIG. 1 and FIG. 2) to the main body 110, the first protrusion 146 leans against the end E1 of the first sliding slot 149a, and the second protrusion 148 leans against the end E2 of the second sliding slot 149b. Thereby, when the user pushes the knob 149 shown in FIG. 3 along the first direction D1, the knob 149 pushes the first protrusion 146 via the end E1 of the first sliding slot 149a; when the user pushes the knob 149 shown in FIG. 3 along the second direction D2, the knob 149 pushes the second protrusion 148 via the end E2 of the second sliding slot 149b. Besides, in this embodiment, the knob 149 has a pushing portion 149c exposed on the main body 110, such that the user can move the knob 149 by pushing the pushing portion 149c.

In light of the foregoing, the knob described in the embodiments of the invention has the first and second sliding slots. The first and second protrusions respectively are disposed in or inserted through the first and second sliding slots and are respectively fixed to the first and second position-limiting elements. The first sliding slot allows the knob to move relatively to the first protrusion along the second direction, and the second sliding slot allows the knob to move relatively to the second protrusion along the first direction. Thereby, a user can push the knob along the first direction to drive the first position-limiting element without driving the second position-limiting element, so as to release the first component. In addition, the user can push the knob along the second direction to drive the second position-limiting element without driving the first position-limiting element, so as to release the second component. As such, the first and second components can be fastened or released by a single knob.

Although the invention has been described with reference to the above embodiments, it will be apparent to one of the ordinary skill in the art that modifications to the described embodiments may be made without departing from the spirit of the invention. Accordingly, the scope of the invention will be defined by the attached claims rather than by the above detailed descriptions.

What is claimed is:

1. A position-limiting mechanism comprising:
   a first position-limiting element slidably configured on a main body for securing a first component to the main body;
   an elastic element having a first end and a second end, wherein the first end is directly connected to the first position-limiting element and the second end is directly connected to the main body;
   a second position-limiting element slidably configured on the main body for securing a second component to the main body;
   a knob slidably configured on the main body and movably connected to the first position-limiting element and the second position-limiting element, wherein when the knob slides relatively to the main body along a first direction, the knob drives the first position-limiting element to release the first component, and when the knob slides relatively to the main body along a second direction, the knob drives the second position-limiting element to release the second component; and
   the knob having a first sliding slot and a second sliding slot, the first position-limiting element and the second position-limiting element respectively having a first protrusion and a second protrusion, the first protrusion being inserted into the first sliding slot, the second protrusion being inserted into the second sliding slot, wherein when the knob slides relatively to the main body along the first direction, the knob pushes the first protrusion to drive the first position-limiting element to release the first component and the second sliding slot allows the knob to move relatively to the second protrusion along the first direction, and when the knob slides relatively to the main body along the second direction, the knob pushes the second protrusion to drive the second position-limiting element to release the second component and the first sliding slot allows the knob to move relatively to the first protrusion along the second direction.

2. The position-limiting mechanism as recited in claim 1, wherein the elastic element stores an elastic potential when the knob slides along the first direction and drives the first position-limiting element to release the first component, and the elastic element releases the elastic potential to draw back the knob and the first position-limiting element along the second direction.

3. The position-limiting mechanism as recited in claim 1, wherein an extension direction of the first sliding slot and an extension direction of the second sliding slot are parallel to the first direction and the second direction.

4. The position-limiting mechanism as recited in claim 1, the knob being suitable for pushing the first protrusion via an end of the first sliding slot and pushing the second protrusion via an end of the second sliding slot, wherein when the first position-limiting element secures the first component to the main body, and the second position-limiting element secures the second component to the main body, the first protrusion leans against the end of the first sliding slot, and the second protrusion leans against the end of the second sliding slot.

5. The position-limiting mechanism as recited in claim 1, wherein the knob has a pushing portion exposed on the main body.

6. The position-limiting mechanism as recited in claim 1, wherein the first component and the second component are individual components and are not in direct contact with each other.

7. The position-limiting mechanism as recited in claim 1, wherein the first position-limiting element and the second position-limiting element are configured in parallel.

8. The position-limiting mechanism as recited in claim 1, wherein the first direction and the second direction are opposite to each other.

9. The position-limiting mechanism as recited in claim 1, wherein the first component and the second component are a battery and a bottom cover, respectively.

* * * * *